United States Patent

[11] 3,572,461

| [72] | Inventors | Jean Henri Bertin;<br>Charles Joseph Marchetti, Neuilly-sur-Seine; Guy Marcel Neplaz, Meudon-La-Foret, France |
|---|---|---|
| [21] | Appl. No. | 785,249 |
| [22] | Filed | Dec. 19, 1968 |
| [45] | Patented | Mar. 30, 1971 |
| [73] | Assignee | Societe D'Etudes Et De Developpement Des Aeroglisseurs Marins Terrestres Et Amphibies S.E.D.A.M. Paris, France |
| [32] | Priority | Dec. 22, 1967 |
| [33] | | France |
| [31] | | 133599 |

[54] SYSTEM FOR CONFINING PRESSURE FLUID CUSHIONS, MORE PARTICULARLY FOR GROUND-EFFECT MACHINES
3 Claims, 6 Drawing Figs.

[52] U.S. Cl............................................. 180/126,
114/67, 180/121, 180/127
[51] Int. Cl........................................... B60v 1/04,
B60v 1/16
[50] Field of Search.......................................... 180/126,
120; 180/121; 114/67.1

[56] References Cited
UNITED STATES PATENTS

| 3,205,847 | 9/1965 | Smith........................ | 180/126X |
| 3,276,529 | 10/1966 | Latimer-Needham....... | 180/126 |
| 3,399,644 | 9/1968 | Hunt........................ | 114/67(.1) |
| 3,405,675 | 10/1968 | Cockerell et al............ | 114/67(.1) |

Primary Examiner—A. Harry Levy
Attorney—Stevens, Davis, Miller & Mosher

ABSTRACT: A pressure fluid cushion system for a ground-effect machine movable opposite a surface, the said system comprising two sidewall structures extending substantially parallel to and on each side of the longitudinal medial plane of the machine and having a front end part and a rear end part, the said sidewall structures having sufficient rigidity to resist deformation under the action of variable external forces acting thereon during movement of the machine and laterally bounding a space between the machine and the said surface chambers situated between the said sidewall structures and bounded by flexible skirts which are deformable under the action of said external forces, and means for adjusting the distance of the free end of the said sidewall structures and of the chamber skirts, from the said surface.

Patented March 30, 1971 3,572,461
3 Sheets-Sheet 1
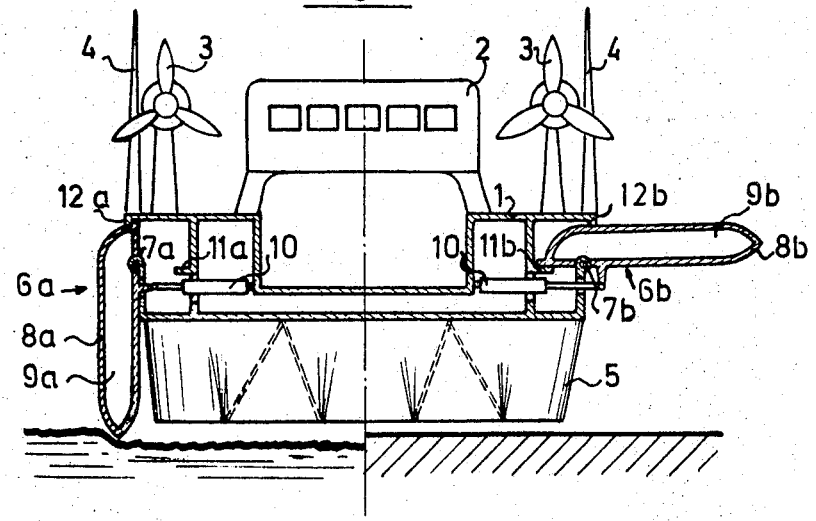
Fig.:1
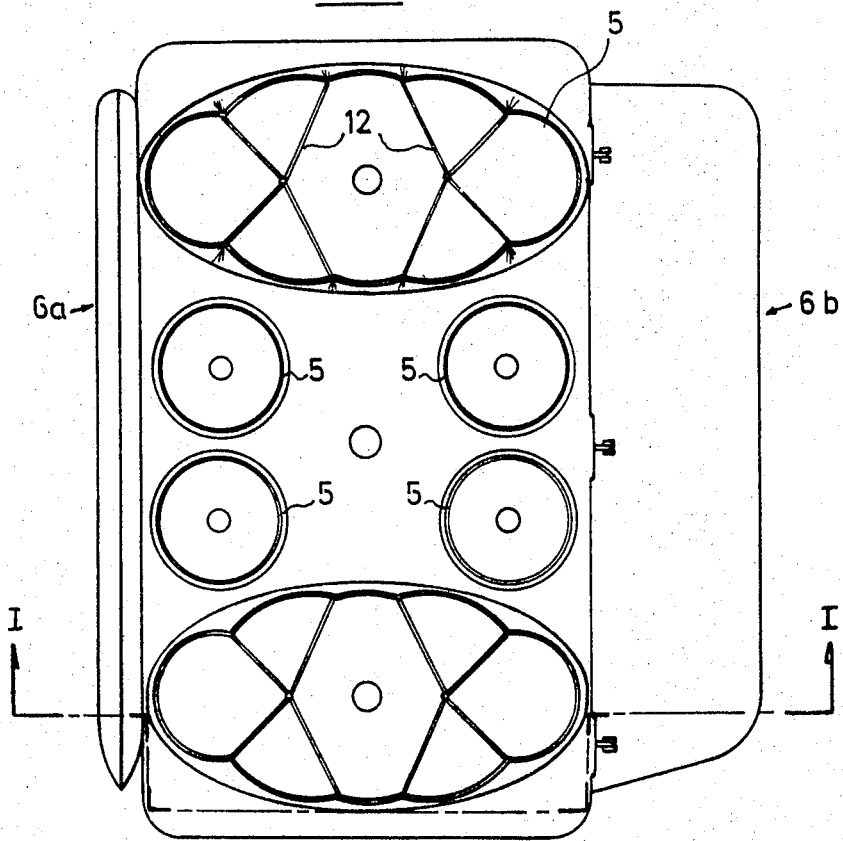
Fig.:2

Patented March 30, 1971 3,572,461
3 Sheets-Sheet 2
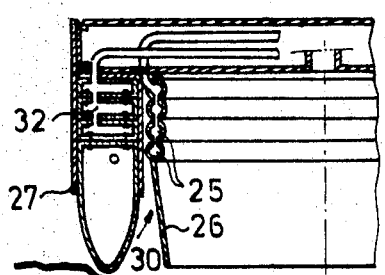
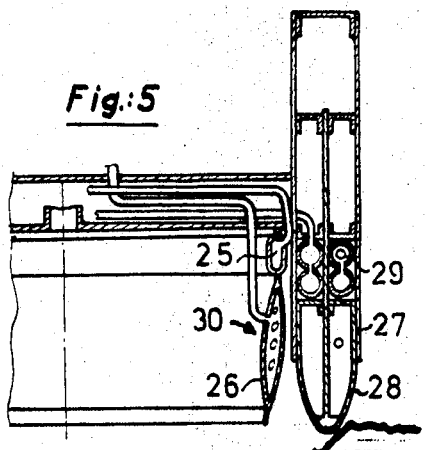
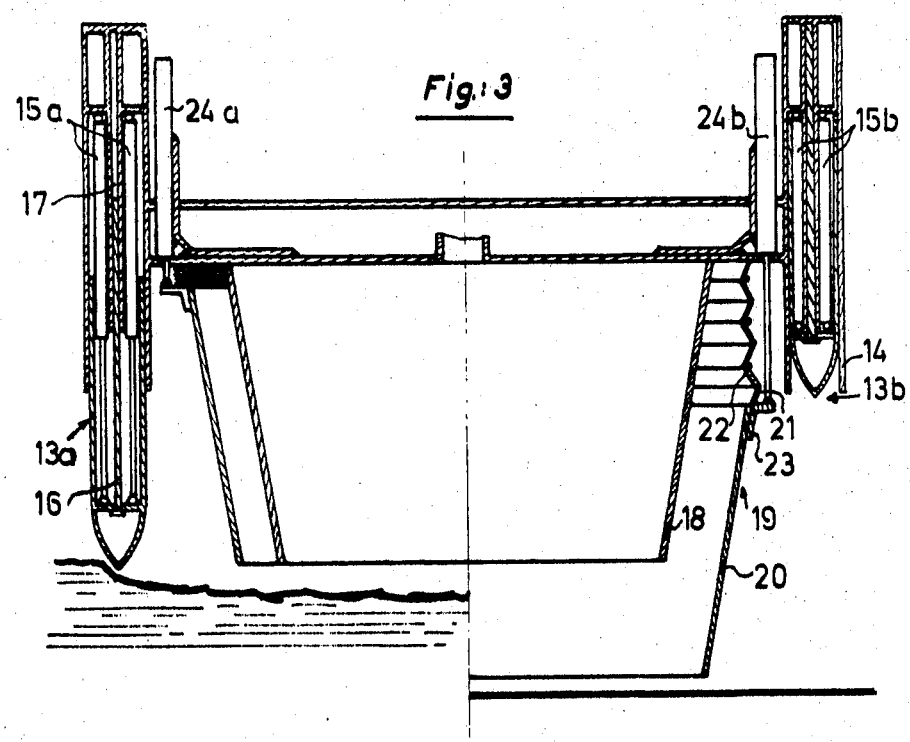

SYSTEM FOR CONFINING PRESSURE FLUID CUSHIONS, MORE PARTICULARLY FOR GROUND-EFFECT MACHINES

This invention relates to improvements to systems for confining pressure fluid cushions, comprising in combination wall structures extending substantially in the longitudinal direction of the machine and at least two bell chambers which are preferably circular in plan view and advantageously have deformable shirts disposed immediately adjacent the sidewalls or even in contact with the latter.

When a combination of this kind is used to confine a pressure fluid cushion beneath a seagoing ground-effect machine, in the space bounded by the chambers and the sidewall structures the latter, when considered perpendicularly to the supporting surface, extend an amount at least equal to that corresponding to the bell chambers or skirts with which the said wall structures cooperate. As a result, it is difficult for the machine to move over a solid surface, e.g. over the ground. To make such machines amphibious, the relative position of the wall structures and of the bell chambers or skirts is adjusted according to the invention by varying the distance between their free ends and the supporting surface.

The height is adjusted of either the skirts or the wall structures, adjustment of the latter being possible by pivoting about a pivot connected to the platform or main structure of the machine, or else preferably both are adjusted together and in opposite directions.

When the machine is travelling over a stretch of water, the distance between the free end of the sidewall structures from the water is preferably equal, at maximum, to the distance of the free end of the skirts from the water. In this case, the machine is supported both by the pressure fluid cushions in the chambers and by the cushion or cushions jointly confined by the sidewall structures and by the chamber skirts.

When the vehicle is moving over land, however, the distance of the free end of the skirt is closer to the ground than the end of the sidewall structures and the machine is supported mainly by the cushions in the chambers, and for this purpose the pressure of these cushions is increased.

In the accompanying drawings:

FIG. 1 is a cross section of a ground-effect machine, taken on the line 1–1 of FIG. 2.

FIG. 2 is a bottom plan view of the machine shown in FIG. 1.

FIG. 3 illustrates two half-views in section of a preferred embodiment of the invention operating respectively on water and land.

FIGS. 4, 5 and 6 are half-sectional views of three alternative embodiments, respectively.

Figure 6:
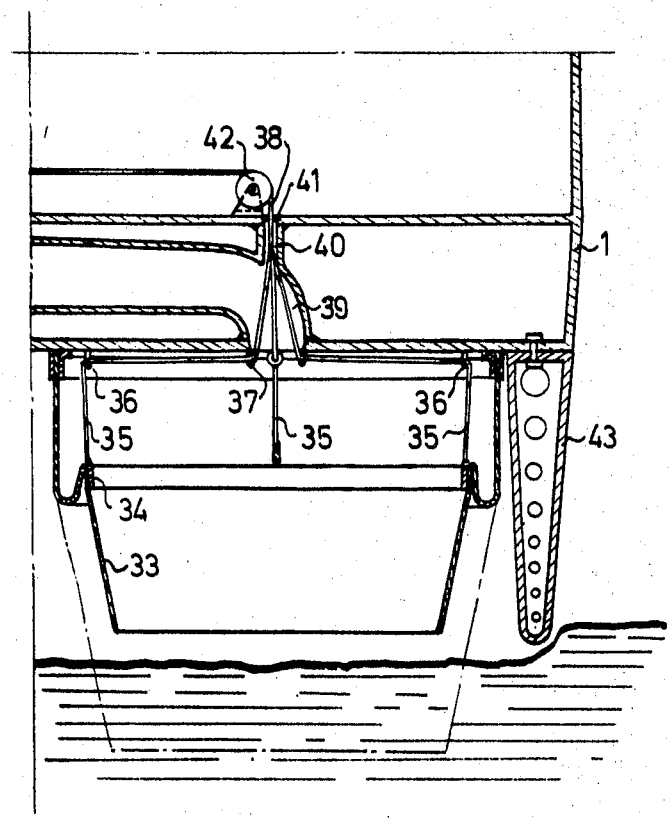

The accompanying drawings show a ground-effect machine according to the invention, with a structure comprising a platform 1 provided with a cabin 2, a pilot's compartment and means for delivering pressure fluid to the supporting cushions, e.g. compressors, and propulsion means, e.g. airscrews 3 associated with rudders 4.

The platform also has chambers 5 with deformable skirts provided with tie rods 12 if they are not circular in plan view, and sidewall structures 6a and 6b extending substantially in the longitudinal direction of the machine.

To make the machine amphibious, the wall structures 6a and 6b can pivot about pivots 7a and 7b connected to the machine structure.

The wall structures 6a and 6b are illustrated in FIGS. 1 and 2 with the former lowered for operation of the machine on water and with the latter raised for operation on land. These sidewalls are hollow and consist of casings 8a, 8b, the capacities 9a, 9b of which can receive various elements and act as a fuel tank. They may also contribute towards making the machine float. These wall structures are disposed longitudinally on each side edge of the platform over the major part of the machine length. Each wall can be subdivided into a plurality of elements, and this is an advantage particularly in the case of large machines.

Jacks, such as the hydraulic jack 10, which in this case are housed inside the platform and are advantageously controlled from the pilot's compartment, are pivotally connected to the platform and to the top part of the sidewall structures 6a and 6b respectively and pivot the latter about pivots 7a, 7b from a position substantially perpendicular to the supporting surface into a raised position which may be very far away from the said surface.

Stops 11a, 11b limit the movement of the sidewall.

With the embodiment shown in FIG. 3 the distance of the free end of the wall structures and of the skirts from the supporting surface can be varied. To this end the sidewall structures 13a or 13b are movable in a guide 14 by jacks 15a, 15b which, for example, may be hydraulic or pneumatic and which are controlled from the pilot's compartment. These walls also have a spindle 16 sliding in a guide 17 to increase the rigidity of the assembly. Each first skirt 18 confining the pressure fluid cushions is surrounded by at least one second skirt 19. This auxiliary skirt 19 has a bottom segment 20 flaring upwardly and near its free end and a bellows part 21. Nonextensible rings 22 prevent the bellows diameter from increasing. The bottom ring is replaced by a base 23 to which the movable arms of jacks 24a, 24b secured to the platform are pivotally connected.

The relative variation of the distance of the free ends of the second skirt and of the sidewall structures from the supporting surface is produced by the action of jacks 15a, 15b and 24a, 24b respectively acting on the top part of the sidewall structures 13a, 13b and on the base 23.

This configuration also allows the machine trim to be controlled by varying the bearing area and the height of the pressure fluid cushions at will by extension of the second skirt 20. For finer adjustment, at least one third skirt may advantageously be provided around the second skirt and be arranged like the latter. Any of the bellows-type skirts is then extended according to the required trim correction.

FIGS. 4 and 5 shows two other embodiments of the invention.

The skirt 30 is formed by superimposing one or more substantially horizontal hollow strips 25 and by a frustoconical portion 26 near its free end, which can be made in a double thickness and be inflatable.

The pressure fluid source (not shown) allows pressure to be supplied to and released from the strips 25 as required so that the skirts can be lowered or raised.

A similar system (FIG. 5) may also be used for lifting or lowering the wall structures. An advantageously hollow wall 28, which may be inflatable if required, and means for varying the height of the wall are advantageously disposed in a guide 27 fixed to the machine platform. These means comprise toric envelopes 29 which in this case communicate with one another and are connected to a pressure fluid source enabling these envelopes to be filled or emptied so that the walls 28 can be lowered or raised.

The system 29 may be replaced (FIG. 4) by a system of compartments 32 connected to a vacuum source by means of which the sidewall structure is moved away from the supporting surface. The resilience of the walls of the compartments 32 brings the said wall structure near to the said surface.

The conical or cylindrical-conical flexible and nonextensible skirt 33 (FIG. 6) is fixed between its two ends to an annular support 34 which is disposed along a directrix of the said skirt and to which lifting cables 35 are attached, four being provided in the example illustrated.

These cables inside the skirt are guided by pulleys or more simply by rings 36 and 37 secured to the structure and are connected to an actuating cable 38.

The cables 35 and 38 may run through the supply conduit 39 and leave it via a passage 40 branching from the latter, a gasket 41 providing a seal. The actuating cable 38 then passes over a pulley 42 and runs to a winch (not shown).

Of course the actuating cables 38 of the various skirts may be connected to a single cable. The platform 1 has sidewall structures 43 which are advantageously hollow and possibly inflatable. The skirt 33, like the adjacent skirt of the same design, is situated between the two wall structures 43.

This embodiment operates as follows:

When operating on water, the distance between the free end of the sidewall structures 43 and the surface must at maximum be equal to the distance of the skirts 33 from said surface, and the cable 38 is therefore wound on the winch so that the free end of the skirts 33 does not project beyond the free end of the sidewall structures 43. For operation on land, however, the cable 38 is unwound and the downward movement is obtained as a result of the conical shape of the skirt 33, by that component of the resultant of the pressure forces acting thereon which is directed towards the free end of the skirt.

This latter type of operation which is shown in chain lines in FIG. 6 thus enables the difference between the distances from the surface to the free end of the walls and to the free end of the skirt respectively to be greatly increased.

We claim:

1. A pressure fluid cushion system for a ground-effect machine movable opposite a surface, the said system comprising two outer sidewall structures extending substantially parallel to and on each side of the longitudinal medial plane of the machine and having a front end part and a rear end part, the said sidewall structures having sufficient rigidity to resist deformation under the action of variable external forces acting thereon during movement of the machine and laterally bounding an inner space between the machine and the said surface, a plurality of separate and distinct chambers situated in said inner space between the said outer sidewall structures and bounded by flexible skirts which are deformable under the action of said external forces, and means for adjusting the distance of the free end of said sidewall structures and of the chamber skirts, from the said surface.

2. A system according to claim 1, comprising a further nonadjustable chamber skirt surrounded by the adjustable chamber skirts, of a fixed length less than the length of the adjustable chamber skirts when they are in the lowered position.

3. A system according to claim 1, wherein the sidewall structures and the chamber skirts are all adjustable as to length, the former being extended when the latter are retracted and vice versa.